(No Model.)

C. YOUNG.
SPRING MOTOR FOR BICYCLES.

No. 567,629. Patented Sept. 15, 1896.

Witnesses:
J. Annie Burnap.
Charles C. Burnap

Inventor:
Carl Young
By Francis W. Poh
Atty.

THE NORRIS PETERS CO., PHOTO-LITHO., WASHINGTON, D. C.

UNITED STATES PATENT OFFICE.

CARL YOUNG, OF CHICAGO, ILLINOIS.

SPRING-MOTOR FOR BICYCLES.

SPECIFICATION forming part of Letters Patent No. 567,629, dated September 15, 1896.

Application filed October 28, 1895. Serial No. 567,148. (No model.)

*To all whom it may concern:*

Be it known that I, CARL YOUNG, a citizen of the United States, residing at Chicago, in the county of Cook and State of Illinois, have invented certain Improvements in Spring-Motors for Bicycles, of which the following is a specification.

My invention relates to spring-motors for bicycles, and has for its object to provide a new and improved spring-motor device which may be connected with the bicycle so as to be utilized in propelling the bicycle forward.

My invention is illustrated in the accompanying drawings, wherein—

Figure 1:
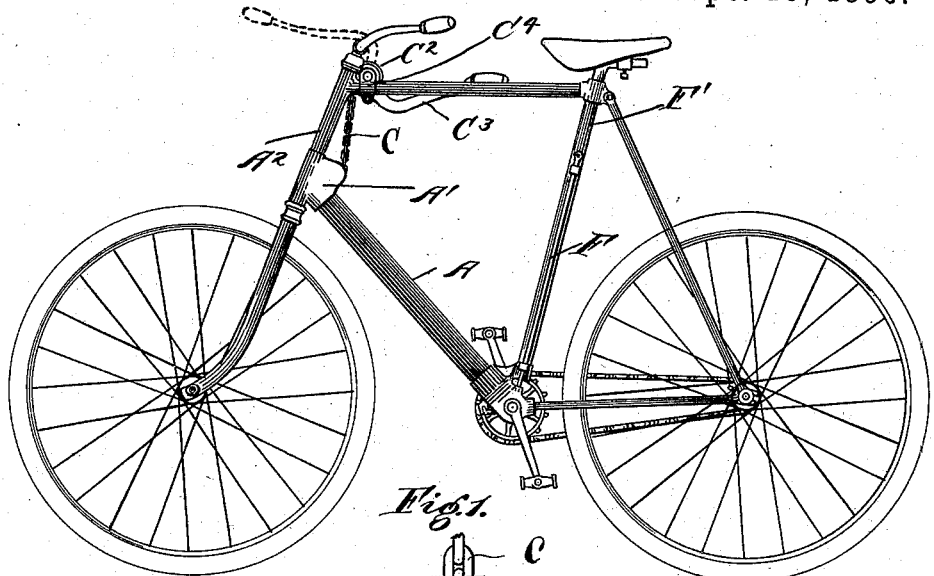
Figure 2:
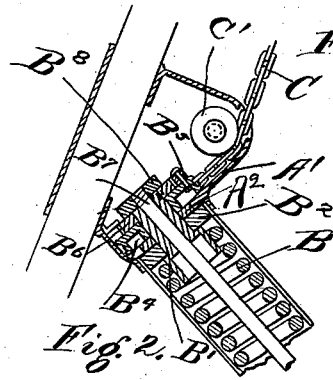
Figure 5:
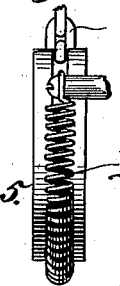
Figure 6:
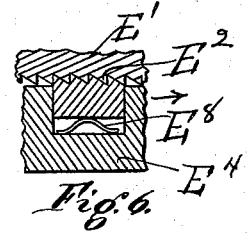
Figure 4:
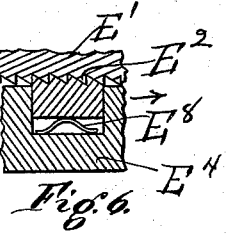
Figure 3:
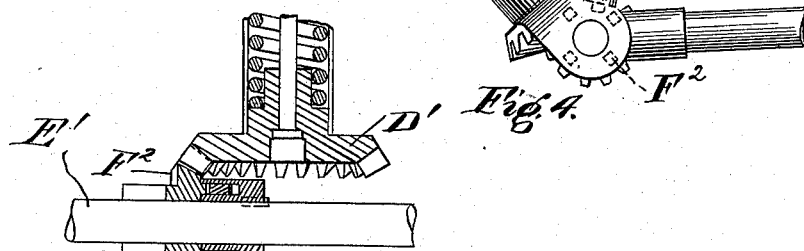

Figure 1 is a side elevation of a bicycle embodying my invention. Fig. 2 is a vertical section through the upper end of the spring-motor. Fig. 3 is a section through the lower end of the spring-motor, showing the connection with the crank-shaft. Fig. 4 is an enlarged side view of the lower end of the spring-motor. Fig. 5 is a detail view of the pulley by which the spring is wound. Fig. 6 is a detail view of the clutch by which the spring-motor is connected with the crank-shaft.

Like letters refer to like parts throughout the several figures.

The spring-motor is contained within the hollow tube or rod A, which connects the front fork with the crank-bearing. This tube is provided at its upper end with the case A', which is connected to the head $A^2$ of the bicycle. A coil-spring B is situated within the tube A and is rigidly connected at its upper end to the head B'. This head projects up within the case A'. A ring $B^2$ is journaled on said head and is brazed to the case A'. A pulley $B^4$ is journaled upon the head B', and is provided with a pawl $B^5$, adapted to engage a ratchet-wheel $B^6$, rigidly connected with the head B'. Said ratchet-wheel $B^6$ is provided with a locking-pawl, which is connected with the case A' in any convenient manner. A rod or tube $B^7$ passes up through a hole in the head B', and has rigidly attached to the other end a ring or washer $B^8$.

A chain or other suitable power-transmitting device C is rigidly connected at one end of the pulley $B^4$ in any convenient manner, and passes upwardly over the pulley C', journaled in the case A'. The upper end of this chain passes over the pulley $C^2$, and is rigidly fastened thereto. An arm $C^3$ is rigidly connected with the pulley $C^2$, so that the arm and pulley move together, said pulley being journaled in the supports $C^4$. The chain C is fastened to the pulley $C^2$ in such a manner that when the arm $C^3$ is moved over to the position indicated in dotted lines the return movement of said arm will rotate the pulley $B^4$ on account of the winding up of the chain on the pulley $C^2$. The pulley $B^4$ has connected therewith a coil-spring $B^9$, the other end of which is attached in any convenient manner to the case A'. This coil-spring tends to rotate the pulley $B^4$ in a direction opposite to the rotation produced by moving the arm $C^3$ from the position shown in dotted lines to the position shown in full lines.

The rod or tube $B^7$ passes downwardly within the coil-spring B and is provided at its lower end with an enlarged head D, adapted to fit within the hollow on the beveled gear D'. This gear and the rod or tube $B^7$ are thus connected together, so that they are free to move with relation to each other. This rod prevents longitudinal motion or vibration of the spring. The coil-spring B is rigidly connected at its lower end to the gear D'.

A beveled pinion E is loosely mounted on the crank-shaft E' and engages the beveled gear D'. The pinion E is provided with the forwardly-projecting teeth $E^2$, adapted to engage the spring-actuated pawls $E^3$ $E^3$ of the clutch $E^4$. These pawls are loosely placed within openings in the clutch and are forwardly pressed by means of the springs $E^8$. This clutch is keyed to the crank-shaft E'. The teeth $E^2$ are provided with beveled edges, as are also the pawls $E^3$. (See Fig. 6.) By this construction the pinion E will not be engaged by the clutch when said clutch has a relative movement with the pinion in the direction indicated by the arrow, Fig. 6, for in such event the pawls $E^3$ will spring backwardly and move past the teeth $E^2$. If the pinion E is rotated in the direction of the arrow, it will be seen that the teeth thereon and the pawls $E^3$ will engage each other, so that the said pinion will be operatively connected with the crank-shaft. A sliding rod F, working in bearings on the seat-post F', is so positioned that its lower end may be inserted in one of the slots $F^2$ $F^2$ in the pinion E. When the end of this rod is inserted in one of these slots, the pinion E and the gear D' will be locked, so that they cannot be rotated.

The sliding rod F may be provided with any suitable locking device by which it can be held out of engagement with the pinion E, or it may be hinged at its upper end, so that when it is pulled upwardly out of engagement with said pinion said upper end can be moved to the position shown in dotted lines, Fig. 1, and will therefore be held in its disengaged position.

I have described these several parts in detail, but it is evident that they may be greatly varied in form, construction, and arrangement, and that some may be omitted and others used with parts not herein shown without departing from the spirit of my invention, and I therefore do not wish to be limited to the construction shown.

The use and operation of my invention are as follows: When it is desired to operate the bicycle by the pedals alone, the sliding rod F is moved downwardly so that its lower end engages the pinion E. When in this position, said pinion and the gear D' are locked against rotation. When the crank-shaft is now rotated by means of the pedals, the pawls $E^3$ of the cluth $E^4$ move past the teeth on the pinion without engaging them. If now it is desired to wind the spring B, the arm $C^3$ is moved to the position shown in dotted lines in Fig. 1. This movement unwinds the chain from the pulley $C^2$. As this chain is unwound the spring B contracts and moves the pulley $B^4$ so as to wind the chain thereupon, the pawl $B^5$ moving over the teeth on the ratchet-wheel $B^6$ without engaging them. The ratchet-wheel is kept from revolving by means of the locking-pawl. If the arm $C^3$ is now pulled forward to the position shown in full lines, the chain is wound upon the pulley $C^2$ and rotates the pulley $B^4$. The pawl $B^5$ on said pulley, coming in contact with the teeth on the ratchet-wheel $B^6$, rotates the head B' and hence winds the spring B, which is connected thereto, the lower end of said spring being locked by means of the sliding rod F. The movement of the arm $C^3$ may be continued until the spring is completely wound. If now it is desired to connect the spring with the crank-shaft, for example, on reaching a hill, the rod F is moved upwardly so as to release the pinion E. The torsion of the spring then produces a rapid rotation of the gear D' and the pinion E, and said pinion will be rotated at a greater rate of speed than the crank-shaft, and the teeth on said pinion will therefore engage the pawls $E^3$ and the pinion will be operatively connected with the crank-shaft so that the torsional effect of the spring will be conveyed thereto and will assist in propelling the bicycle. The arm $C^3$ may also be operated while the spring is operatively connected with the crank-shaft, if desired, and hence the arm and the feet may be used simultaneously to propel the bicycle. When the top of the hill is reached, or when for any reason it is desired to disconnect the spring and the crank-shaft, the sliding rod F is moved downwardly so as to engage the pinion E, and prevents its further rotation.

It will be seen that I have here a light, convenient, and simple power-storage device which may be connected with or disconnected from the crank-shaft at will.

I claim—

1. The combination with a bicycle, of a power-storing device concealed within the part of the frame of the bicycle that connects the front fork with the crank-bearing, a controllable connection between said power-storing device and the crank-shaft of the bicycle, and a hand-operated means associated with said power-storing device for supplying power thereto.

2. A power-storing device for bicycles, comprising a coil-spring, a rotatable head connected with one end of said spring, and having a ratchet-wheel connected therewith, a revoluble wheel or disk associated with said head and operatively connected with said ratchet-wheel, an arm or the like connected with said wheel so as to rotate it when moved and so situated as to be operated by the hand of the rider and a connection between said spring and the crank-shaft of the bicycle the whole so arranged that the hands and the feet may be used to aid in propelling the bicycle.

3. The combination with a bicycle of a power-storing device comprising a coil-spring concealed within the frame of the bicycle, a rotatable head to which said spring is attached, an arm operatively connected with said head and within the reach of the hand of the rider and a controllable connection between said spring and the bicycle-wheel whereby two sources of power may be applied to the bicycle either simultaneously or separately, substantially as described.

4. The combination with a bicycle of a spring-motor comprising a coil-spring concealed within the part of the frame connecting the front fork with the crank-bearing and connected at one end with a rotatable head, an arm operatively connected with said head, said spring connected at the other end with a gear-wheel, a pinion loosely mounted upon the crank-shaft of the bicycle and in engagement with said gear-wheel and a clutch rigid on said shaft and adapted to automatically connect the pinion therewith when said pinion is rotated faster than the shaft.

5. The combination with a bicycle of a spring-motor comprising a coil-spring connected at one end with a rotatable head, an arm operatively connected with said head, said spring connected at the other end with a gear-wheel, a pinion loosely mounted upon the crank-shaft of the bicycle and in engagement with said gear-wheel, and a clutch rigid on said shaft and adapted to automatically connect the pinion therewith when said spring is rotated faster than the shaft and a locking device associated with one end of said spring and adapted to prevent its rotation.

6. The combination with a bicycle of a spring-motor comprising a coil-spring connected at one end with a rotatable head, an arm operatively connected with said head, said spring being connected at the other end with a gear-wheel, a pinion loosely mounted upon the crank-shaft of the bicycle and in engagement with said gear-wheel, a clutch rigidly connected with said crank-shaft, and provided with spring-actuated pawls adapted to engage teeth upon said pinion, said teeth and pawls so shaped that the pinion will be operatively connected with the crank-shaft only when it is rotated at a speed greater than the speed of the crank-shaft.

7. The combination with a bicycle of a spring-motor comprising a coil-spring connected at one end with a rotatable head, an arm operatively connected with said head, said spring being connected at the other end with a gear-wheel, a pinion loosely mounted upon the crank-shaft of the bicycle and in engagement with said gear-wheel, a clutch rigidly connected with said crank-shaft, and provided with spring-actuated pawls adapted to engage teeth upon said pinion, said teeth and pawls so shaped that the pinion will be operatively connected with the crank-shaft only when it is rotated at a speed greater than the speed of the crank-shaft, and a sliding rod having one end within the reach of the rider, the other end of said rod adapted to be inserted in slots or holes in said pinion so as to lock it and prevent its rotation.

8. The combination with a bicycle of a spring-motor comprising a coil-spring connected at one end with a rotatable head having a ratchet-wheel rigidly connected therewith, a rotatable disk or pulley associated with said head and provided with a pawl adapted to engage said ratchet-wheel, a flexible power-transmitting device fastened to said pulley, and adapted to move it in one direction, a spring associated with said pawl and adapted to move it in an opposite direction, a second pulley to which said flexible power-transmitting device is fastened, an arm connected with said second pulley and adapted by its movement to rotate said pulley through a partial revolution, and a controllable connection between said spring and the wheel of the bicycle whereby the spring may be operatively connected therewith.

9. The combination with a bicycle of a spring-motor comprising a coil-spring connected at one end with a rotatable head having a ratchet-wheel rigidly connected therewith, a rotatable disk or pulley associated with said head and provided with a pawl adapted to engage said ratchet-wheel, a flexible power-transmitting device fastened to said pulley, and adapted to move it in one direction, a spring associated with said pawl and adapted to move it in an opposite direction, a second pulley to which said flexible power-transmitting device is fastened, an arm connected with said second pulley and adapted by its movement to rotate said pulley through a partial revolution, a gear-wheel to which the lower end of said spring is fastened, a pinion loosely mounted upon the crank-shaft of the bicycle and in engagement with said gear-wheel, a clutch rigid on said crank-shaft and adapted to operatively engage said pinion therewith when the pinion is rotated at a greater speed than the crank-shaft.

10. The combination with a bicycle of a spring-motor comprising a coil-spring connected at one end with a rotatable head having a ratchet-wheel rigidly connected therewith, a rotatable disk or pulley associated with said head and provided with a pawl adapted to engage said ratchet-wheel, a flexible power-transmitting device fastened to said pulley, and adapted to move it in one direction, a spring associated with said pawl and adapted to move it in an opposite direction, a second pulley to which said flexible power-transmitting device is fastened, an arm connected with said second pulley and adapted by its movement to rotate said pulley through a partial revolution, a gear-wheel rigidly connected to one end of said spring, a pinion in engagement with said gear-wheel and loosely mounted upon the crank-shaft of the bicycle, a clutch rigidly connected with said shaft and provided with spring-actuated pawls adapted to engage teeth on said pinion, said pawls and teeth so shaped that they only operatively engage each other when the pinion is rotated at a greater rate of speed than the shaft substantially as described.

CARL YOUNG.

Witnesses:
DONALD M. CARTER,
BERTHA C. SIMS.